United States Patent
Kazan

(10) Patent No.: US 12,227,283 B2
(45) Date of Patent: Feb. 18, 2025

(54) PROPULSION SYSTEM WITH SYNERGISTIC PUSHER TYPE PROPELLER

(71) Applicant: Yasin Tolga Kazan, Eskisehir (TR)

(72) Inventor: Yasin Tolga Kazan, Eskisehir (TR)

( * ) Notice: Subject to any disclaimer, the term of this patent is extended or adjusted under 35 U.S.C. 154(b) by 0 days.

(21) Appl. No.: 18/288,847

(22) PCT Filed: Apr. 28, 2022

(86) PCT No.: PCT/TR2022/050388
§ 371 (c)(1),
(2) Date: Oct. 30, 2023

(87) PCT Pub. No.: WO2022/231558
PCT Pub. Date: Nov. 3, 2022

(65) Prior Publication Data
US 2024/0199197 A1    Jun. 20, 2024

(30) Foreign Application Priority Data
Apr. 28, 2021   (TR) .............................. 2021/007218

(51) Int. Cl.
| | |
|---|---|
| B64C 11/28 | (2006.01) |
| B64D 27/02 | (2006.01) |
| F02K 3/10 | (2006.01) |
| F02K 9/42 | (2006.01) |

(52) U.S. Cl.
CPC ............ *B64C 11/28* (2013.01); *B64D 27/023* (2013.01); *F02K 9/42* (2013.01); *F02K 3/10* (2013.01)

(58) Field of Classification Search
CPC ....... B64C 11/28; B64D 27/023; B64D 27/00; B64D 27/02; F02K 9/42; F02K 3/10
See application file for complete search history.

(56) References Cited

U.S. PATENT DOCUMENTS

| | | |
|---|---|---|
| 2,540,991 A | 2/1951 | Price |
| 2,613,749 A | 10/1952 | Price |
| 2015/0136897 A1 | 5/2015 | Seibel et al. |
| 2021/0206487 A1* | 7/2021 | Iqbal ...................... B64C 11/28 |

FOREIGN PATENT DOCUMENTS

WO        2020058706 A1      3/2020

* cited by examiner

*Primary Examiner* — Brandon D Lee
(74) *Attorney, Agent, or Firm* — Bayramoglu Law Offices LLC

(57) ABSTRACT

A propulsion system suitable for use in aircrafts (for example propeller plane) is provided. The propulsion system includes at least one propeller hub, which is mountable to at least a portion of the aircraft and includes at least one rotatable propeller blade thereon, propeller blade which is foldable, at least one fuel nozzle which is provided on the propeller hub and used to spray fuel into the section where the propeller blades are folded.

20 Claims, 2 Drawing Sheets

PROPULSION SYSTEM WITH SYNERGISTIC PUSHER TYPE PROPELLER

CROSS REFERENCE TO THE RELATED APPLICATIONS

This application is the national phase entry of International Application No. PCT/TR2022/050388, filed on Apr. 28, 2022, which is based upon and claims priority to Turkish Patent Application No. 2021/007218, filed on Apr. 28, 2021, the entire contents of which are incorporated herein by reference.

TECHNICAL FIELD

The present invention relates to increasing the maximum speed of aircrafts driven by a pusher type propeller.

BACKGROUND

The maximum speed of all propeller-driven aircraft is quite limited due to the ultrasonic airspeeds that occur at the tip of the propeller at high flying speeds; but at low speeds the propellers are a very useful propulsion system. In order to increase the speed limit, in many designs, the propellers were produced with their tip curved backwards, they were produced such that their tip folds back to some extent when accelerated in-flight or one large propeller was replaced with two smaller propellers. Even though some of these designs are experimental, most of them have been successful in slightly increasing the maximum speed of propeller-driven aircraft. However, speed and efficiency are very important reasons for preference in aircrafts such as planes, and the structure with folding propeller used in the current technique is not sufficient for aircraft speed and/or propulsion at high speeds is not efficient.

SUMMARY

The objective of the present invention is to provide a propulsion system with synergistic pusher type propeller which is used in propeller-driven aircraft and enables the speed of the aircraft to be increased.

The objective of the present invention is to provide a propulsion system with synergistic pusher type propeller which is used in propeller-driven aircraft and enables the efficiency of the aircraft to be increased within the speed limit band.

The objective of the present invention is to provide a method of increasing the speed which is used in propeller-driven aircraft and enables the speed of the aircraft to be increased.

The invention aims to make the pusher type propeller-driven aircraft fly faster by operating conventionally at low speeds and reducing the airspeed at the tip of the propeller at high speeds and supporting with additional thrust methods. It also provides a hybrid system for propellers powered by an electric motor.

THE DESCRIPTION OF THE REFERENCES IN THE FIGURES

Figure 1:
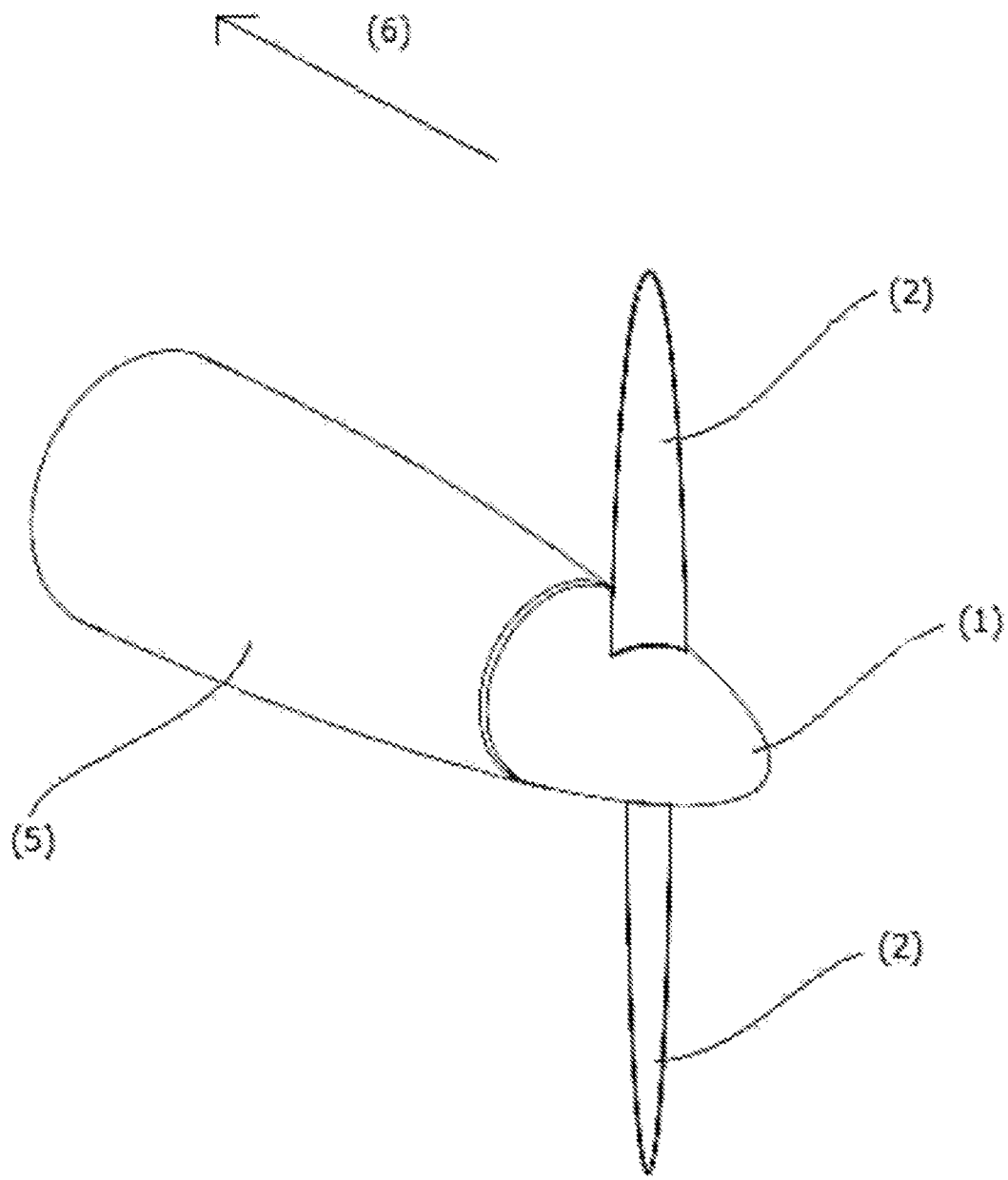
FIG. 1. Perspective view of a portion of aircraft propelled by a conventional (known in the state of the art) pusher type propeller.
Figure 2:
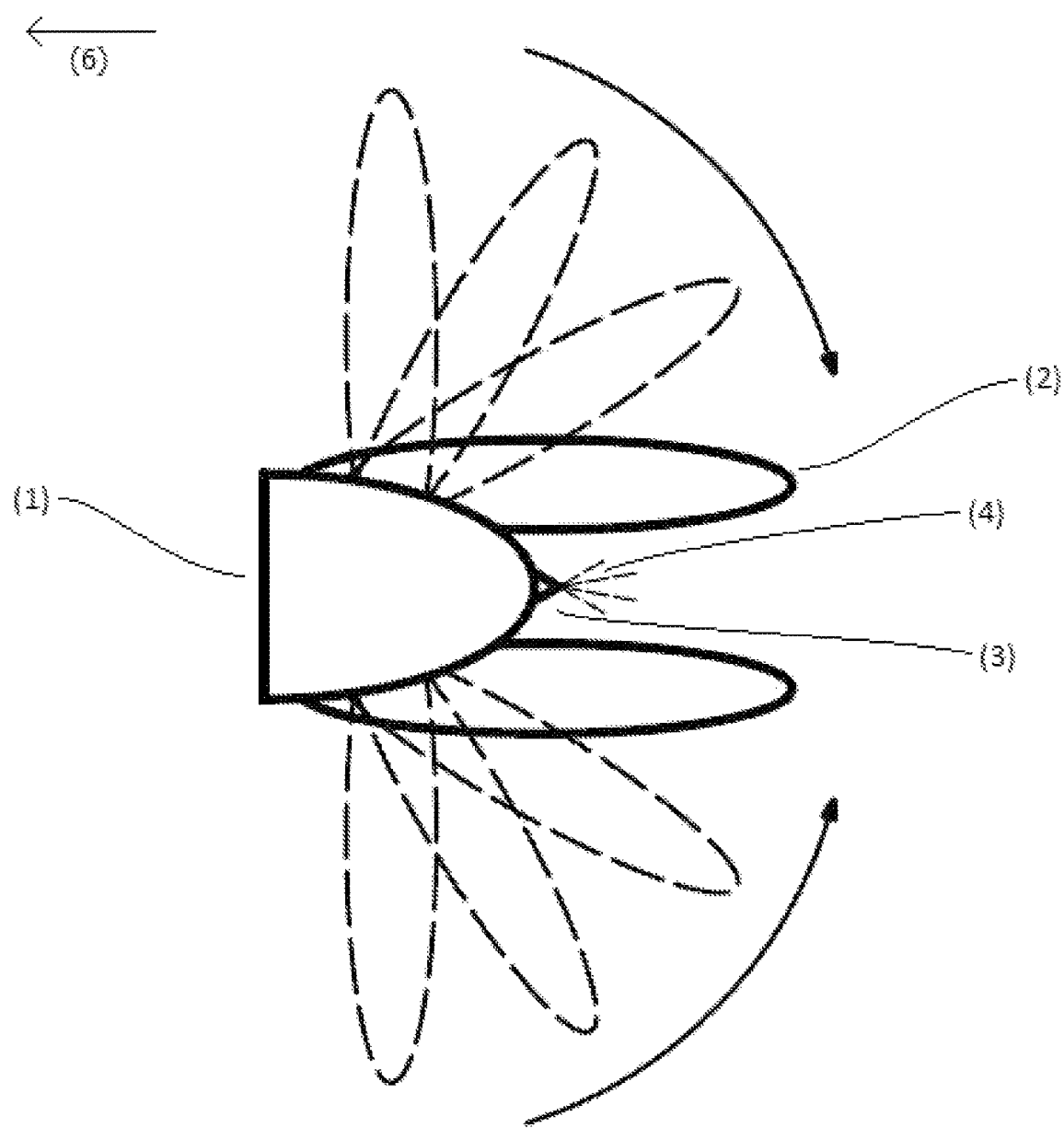
FIG. 2. Side view of the propulsion system in the invention, the folding manner and closed position of the blades.

1. Propeller hub
2. Propeller blade
3. Igniter (for non-self-igniting fuels)
4. Fuel nozzle (4)
5. Aircraft
6. The moving direction of the aircraft

DETAILED DESCRIPTION OF THE EMBODIMENTS

A propulsion system suitable for use in aircrafts (5) comprises
at least one propeller hub (1) which is mountable to at least a portion of the aircraft (5) and comprises at least one rotatable propeller blade (2) thereon,
propeller blade (2) which is foldable,
at least one fuel nozzle (4) which is used to spray fuel into the section where the propeller blades (2) are folded.

The present invention is a propulsion system having a propeller, which is rear-mounted to an aircraft (5) and whose blades (2) can be folded backwards, and a fuel nozzle (4) which is capable of spraying fuel between the propeller blades (2) in their closed position; and it is characterized in that by means of folding the propeller blades (2) backwards, a high pressure area is created between the propeller blades (2) and by means of spraying fuel into this high pressure area and burning it, propulsion systems with propeller do not lose their propulsion properties at high speeds and their efficiency does not decrease.

The present invention is a propulsion system having at least one propeller which is rear-mounted to the aircraft (5) and whose blades (2) can be folded backwards, and a fuel nozzle (4) which is capable of spraying fuel between the propeller blades (2) in their closed position.

The system operates conventionally at low speeds and benefits from the advantages of the pusher type propeller. At high speeds, it folds the propeller blades (2) backwards, reducing the rotational diameter of the tip of the blade (2), thereby reducing the airspeed. Since the effective diameter of the propeller will decrease with the closing of the propeller blades (2), the amount of propulsion decreases; however, the propeller blades (2) will act as a kind of radial inflow compressor while continuing to rotate in the folded position. The system of the present invention continues to provide propulsion with a rocket principle by spraying fuel into the high-pressure area which is formed between the propeller blades (2) via a fuel nozzle (4) and burning it.

For non-self-igniting fuels, there is an additional igniter (3) to ignite the fuel sprayed into the high-pressure area.

In an embodiment of the present invention, the propeller blades (2) are connected onto the aircraft (5) in a foldable manner in the opposite direction of flight. In an embodiment of the invention, there is a drive device which transfers drive on the propeller blade(s) (2) for the folding process. In another embodiment of the invention, the drive device is a motor, a hydraulic, pneumatic piston or electric direct drive mechanism.

In one embodiment of the invention, there is at least one control unit which transmits a command to a drive device to fold the propeller blades (2) at a predetermined speed or by user's demand. Here, a separate speed sensor or the speed detection unit of the aircraft (5) can be used to detect that the predetermined speed has been exceeded. In another embodiment of the present invention, there is at least one interface (button, keypad, touch screen, etc.) for the user to transmit the command to fold the blades (2) to the control unit.

In an embodiment of the invention, a thrust amount is transmitted by the user to the control unit via the user interface and there is a control unit adapted to transmit the command to fold the blades in case the thrust amount is less than the requested amount. In another embodiment of the invention, the control unit is adapted to transmit the command to fold the blades in case of detecting a decrease in the efficiency of thrust by the propeller. The said thrust amount is the amount of thrust force, it is the mechanical force which enables the aircraft to accelerate and/or maintain its speed against the resistances (air resistance, etc.) to which the aircraft is exposed.

In one embodiment of the invention, the fuel nozzle (4) is connected to a fuel tank with a hose or a similar structure. In another embodiment of the present invention, there is a control unit which transmits a command to the fuel nozzle (4) for the operation of the fuel nozzle (4). In another embodiment of the invention, the control unit determines the amount of fuel sprayed from the fuel nozzle (4) and transmits a command to the fuel nozzle (4) to spray/pump the determined amount of fuel.

In an embodiment of the present invention, the control unit is adapted to transmit a command to operate the fuel nozzle (4) when the propeller blade (2) is folded.

In an embodiment of the invention, the propeller hub (1) is used by being mounted to the rear part of the aircraft (5) according to the moving direction of the aircraft (6).

In an embodiment of the invention, the propeller blade (2) can be folded from the propeller hub (1) towards the opposite direction of the moving direction of the aircraft (5).

In an embodiment of the present invention, the fuel nozzle (4) is located behind the propeller blade (2) relative to the moving direction (6) of the aircraft (5). In this way, if the propeller blades (2) are folded, the fuel nozzle (4) can spray fuel into the high-pressure area, which is the area between the propeller blades (2).

In an embodiment of the invention, the igniter (3) is controlled by a control unit. If the control unit determines that ignition is required, it transmits a command for the igniter (3) to activate it.

In an embodiment of the present invention, there is at least one sensor used to measure/detect whether combustion occurs in the region which is formed between the propeller blades (2). In one embodiment of the invention, the sensor is a combustion sensor. In another embodiment of the present invention, the signal/information from the sensor is transmitted to the control unit, and the control unit evaluates the information about the absence of combustion, or the stopping of combustion and can send a command to the igniter (3) to activate it In an embodiment of the present invention, there is at least one thrust force sensor which is used to measure whether combustion occurs in the region which is formed between the propeller blades (2). The control unit evaluates that there is not enough thrust force even though the propeller blades (2) are folded and fuel is being sprayed, and detects that combustion has not occurred, and activates the igniter (3). In another embodiment of the present invention, the signal/information from the thrust force sensor is transmitted to the control unit, and the control unit evaluates the information about the absence of combustion, or the stopping of combustion and it can send a command to the igniter (3) to activate it.

In one embodiment of the invention, the igniter (3) is used to start the first combustion in the area which is formed between the blades after the closing of the propeller blades (2) or to restart it in the event of unintentional stopping of the combustion and/or to sustain the combustion (depending on the fuel type).

In an embodiment of the invention, it is a single control unit that creates commands for the operation of the fuel nozzle (4) the adjustment of the amount of fuel sprayed, the process of folding the propeller blades and/or firing the igniter (3). In another embodiment of the invention, there are separate control units that create commands for the operation of the fuel nozzle (4), the adjustment of the amount of fuel sprayed, the process of folding the propeller blades and/or the firing of the igniter (3). In another embodiment of the present invention, this control unit is the aircraft (5) thrust controller.

The invention is a method of increasing the aircraft speed and expanding the efficiency range of the thrust depending on speed; and comprises the process steps of folding the propeller blade (2) in case the thrust efficiency of the propellers decreases, spraying fuel into the high-pressure area which is formed between the blades when the propellers are in the folded position, firing the igniter (3) to start the combustion process in the absence of auto-ignition depending on the type of the fuel sprayed.

In one embodiment of the invention, the aircraft (5) is a propeller plane.

In an embodiment of the invention, there is a method step of "the control unit determining the amount of fuel to be transferred" before the process step of "spraying fuel into the high-pressure area which is formed between the blades when the propellers are in the folded position".

THE INDUSTRIAL APPLICABILITY OF THE INVENTION

The invention can increase the maximum speed of any aircraft with rear-mounted propellers, which can be used for any purpose. Therefore, it also allows a propeller-driven aircraft to reach high speeds without losing its advantage. Furthermore, it is inevitable that the use of electric aircraft will increase with the expected developments in battery technology, and when they become common, a system suitable for the use of electricity and combustible fuels together, just like in hybrid cars, can be created.

An aircraft (5), comprising at least one propeller blade (2) and a propeller hub (1) to which a propeller blade (2) is mounted, comprises a propulsion system comprising propeller blade (2) which is foldable, at least one fuel nozzle (4) which is used to spray fuel into the section where the propeller blades (2) are folded.

What is claimed is:

1. A propulsion system comprising a propeller, wherein the propeller is rear-mounted to an aircraft and propeller blades of the propeller are allowed to be folded backwards; and a fuel nozzle, wherein the fuel nozzle is allowed for spraying a fuel between the propeller blades in a closed position of the propeller blades;

wherein by means of folding the propeller blades backwards, a high pressure area is created between the propeller blades and by means of spraying the fuel into the high pressure area and burning the fuel, the propeller blades does not lose propulsion properties at high speeds.

2. An aircraft comprising the propulsion system according to claim 1, wherein the propulsion system comprises a propeller hub, wherein the at least one propeller blade is mounted to the propeller hub, wherein the at least one fuel nozzle is provided on the propeller hub and configured to spray the fuel into a section where the propeller blades are folded.

3. The propulsion system according to claim 1, wherein the propulsion system comprises an igniter in addition to the fuel nozzle, wherein the igniter enables the fuel sprayed by the fuel nozzle to be ignited in case the fuel does not self-ignite.

4. The propulsion system according to claim 1, comprising a drive device, wherein the drive device transfers drive onto the propeller blade(s), wherein the propeller blades are folded in opposite direction of a flight direction of the aircraft.

5. The propulsion system according to claim 1, at least one control unit, wherein the at least one control unit is adapted to transmit a command to a drive device to fold the propeller blades in case a speed is exceeded, wherein the speed is predetermined automatically or by a user.

6. The propulsion system according to claim 1, comprising a control unit, wherein the control unit transmits a command to the fuel nozzle to operate the fuel nozzle.

7. The propulsion system according to claim 1, comprising a control unit, wherein the control unit is adapted to determine an amount of fuel to be sprayed by the fuel nozzle and to transmit a command to the fuel nozzle to spray a desired amount of fuel.

8. The propulsion system according to claim 1, comprising a control unit, wherein the control unit is adapted to transmit a command to operate the fuel nozzle in case the propeller blade is folded.

9. The propulsion system according to claim 1, comprising at least one sensor, wherein the at least one sensor is configured to measure whether a combustion occurs in a region formed between the propeller blades.

10. The propulsion system according to claim 1, comprising a sensor, wherein the sensor is a combustion sensor.

11. The propulsion system according to claim 1, comprising a control unit, wherein the control unit communicates with a sensor and is adapted to evaluate information about an absence of combustion or a stopping of combustion via incoming signal/information, and to transmit a command to an igniter to activate the igniter.

12. The propulsion system according to claim 1, comprising a thrust force sensor, wherein the thrust force sensor detects at least one thrust force configured to measure whether a combustion occurs in a region formed between the propeller blades.

13. The propulsion system according to claim 1, comprising a control unit, wherein the control unit communicates with a thrust force sensor and is adapted to evaluate information about an absence of combustion or a stopping of combustion via incoming signal/information, and to transmit a command to an igniter to activate the igniter.

14. A propulsion system suitable for use in aircrafts comprising
at least one propeller hub, wherein the at least one propeller hub is mountable to at least a portion of the aircraft and comprises at least one rotatable propeller blade the at least one propeller hub,
the at least one rotatable propeller blade, wherein the at least one rotatable propeller blade is foldable,
at least one fuel nozzle, wherein the at least one fuel nozzle is configured to spray the fuel into a section where the propeller blades are folded.

15. An aircraft comprising the propulsion system according to claim 14, wherein the at least one fuel nozzle is provided on the propeller hub and configured to spray the fuel into the section where the propeller blades are folded.

16. The propulsion system according to claim 14, wherein the propulsion system comprises an igniter in addition to the fuel nozzle, wherein the igniter enables the fuel sprayed by the fuel nozzle to be ignited in case the fuel does not self-ignite.

17. The propulsion system according to claim 14, comprising a drive device, wherein the drive device transfers drive onto the propeller blade(s), wherein the propeller blades are folded in opposite direction of a flight direction of the aircraft.

18. A method of increasing an aircraft speed for expanding an efficiency range of the aircraft speed and thrust depending on a speed in an aircraft, wherein the method comprises
folding the propeller blade in case a thrust efficiency of the propellers decreases,
spraying a fuel into a high-pressure area formed between the propeller blades when the propellers are in a folded position.

19. The method of increasing the aircraft speed according to claim 18, further comprising performing a combustion process via an igniter in an absence of auto-ignition depending on a type of the fuel sprayed.

20. The method of increasing the aircraft speed according to claim 19, wherein the propulsion system comprises a thrust force sensor, the thrust force sensor detects at least one thrust force configured to measure whether a combustion occurs in a region formed between the propeller blades.

* * * * *